Oct. 2, 1934.  J. D. GRABILL  1,975,687
FRUIT CLEANING AND POLISHING MACHINE
Filed Dec. 12, 1932  4 Sheets-Sheet 1

Inventor
JOHN D. GRABILL.

By Milans & Milans
Attorneys

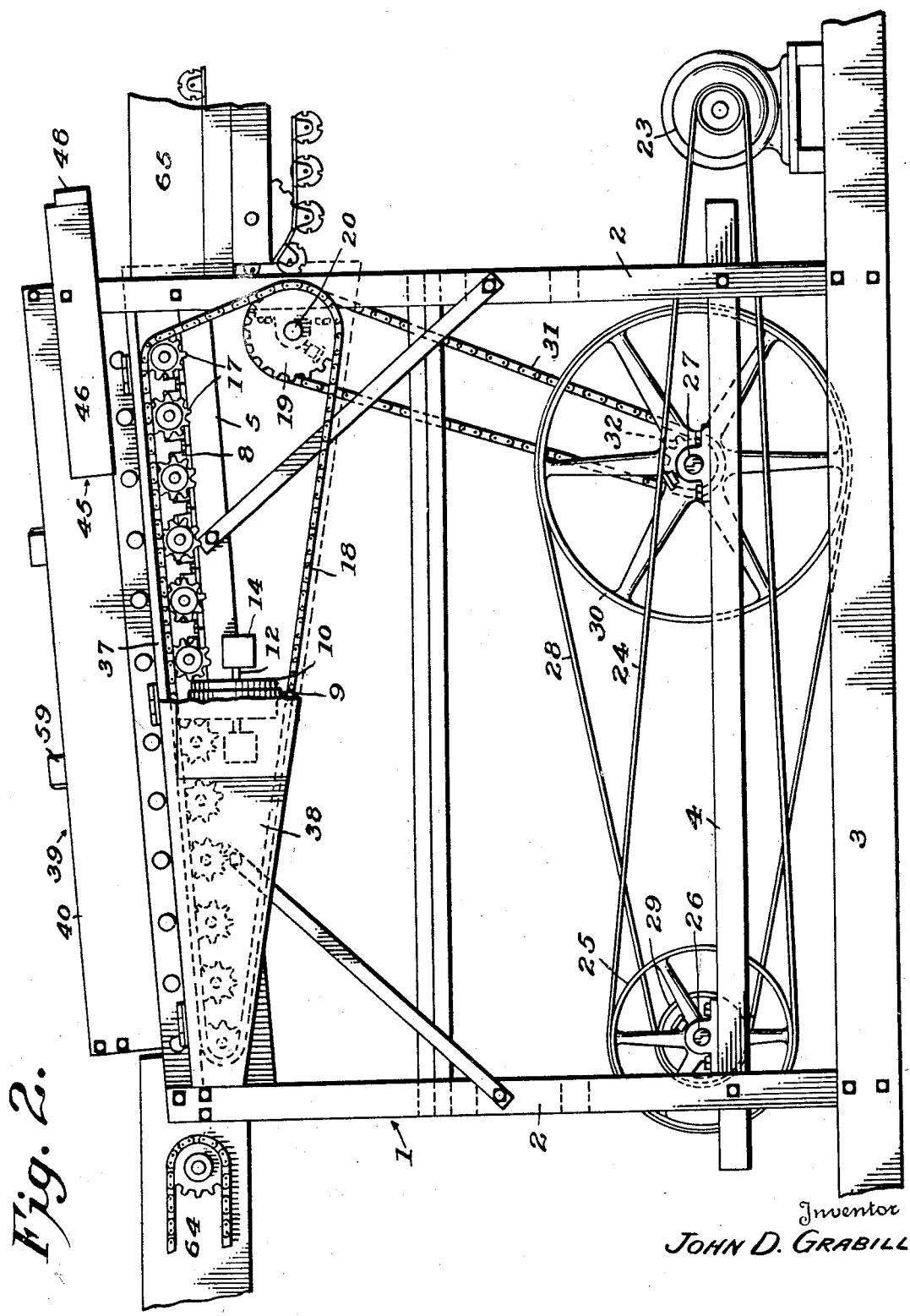

Oct. 2, 1934.   J. D. GRABILL   1,975,687
FRUIT CLEANING AND POLISHING MACHINE
Filed Dec. 12, 1932   4 Sheets-Sheet 3
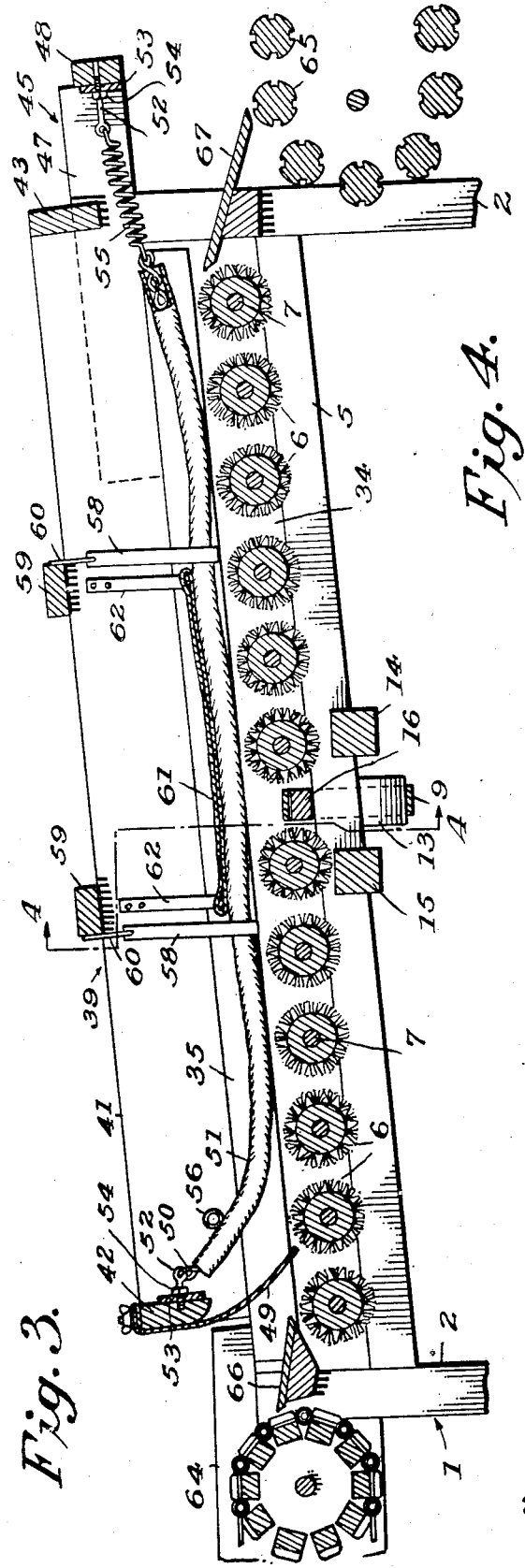
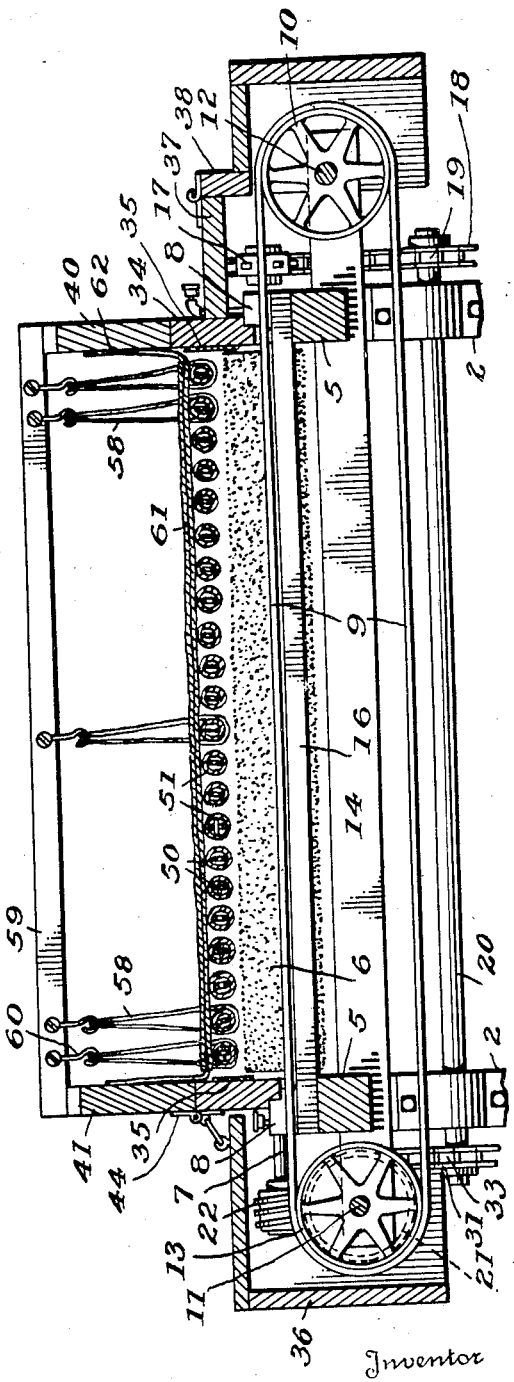
Inventor
JOHN D. GRABILL.
By Milans & Milans
Attorneys Oct. 2, 1934.   J. D. GRABILL   1,975,687
FRUIT CLEANING AND POLISHING MACHINE
Filed Dec. 12, 1932   4 Sheets-Sheet 4
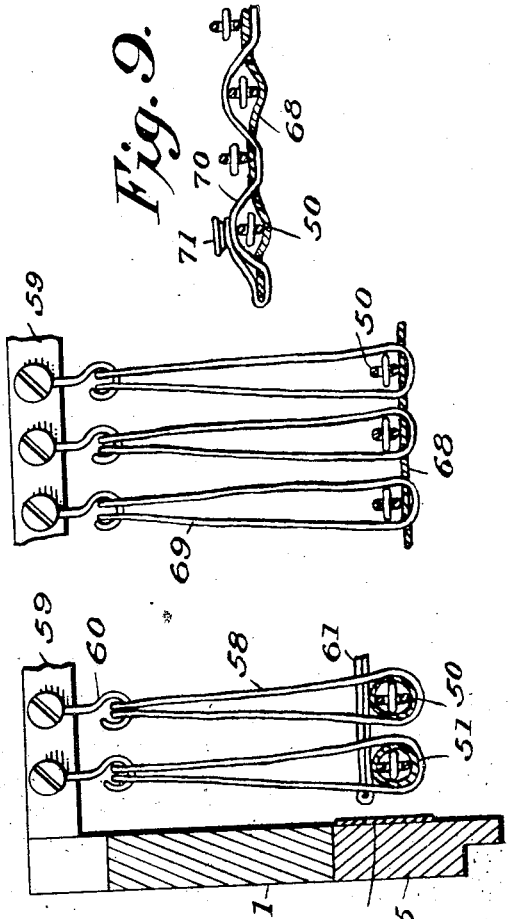
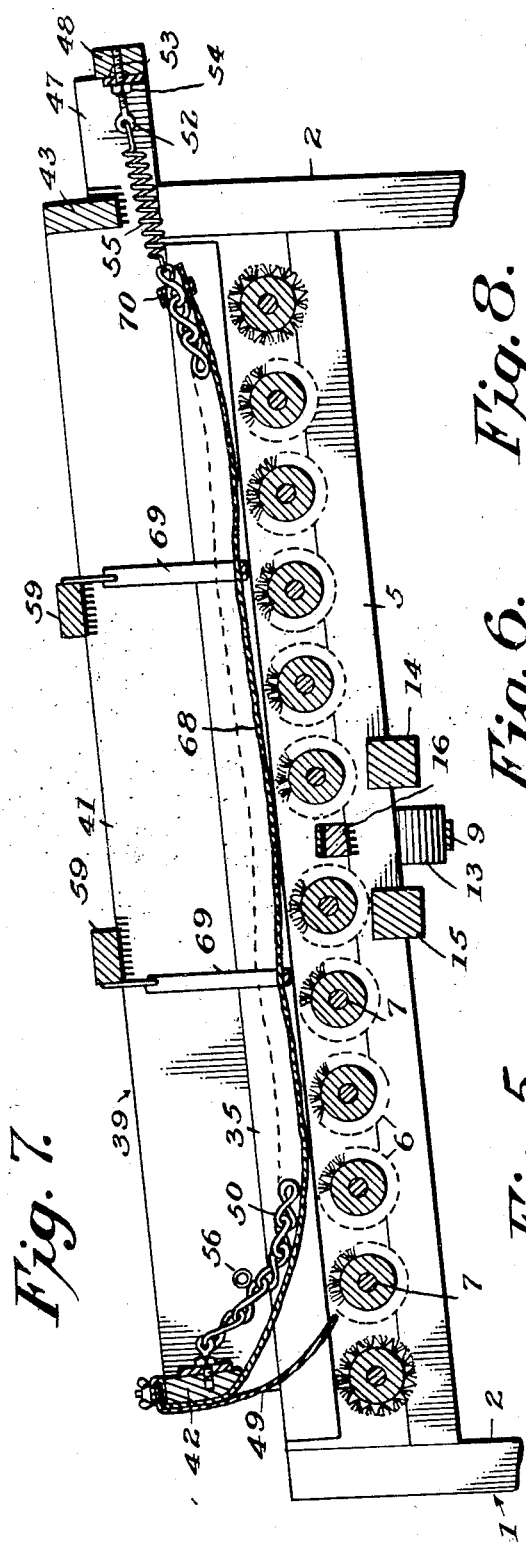
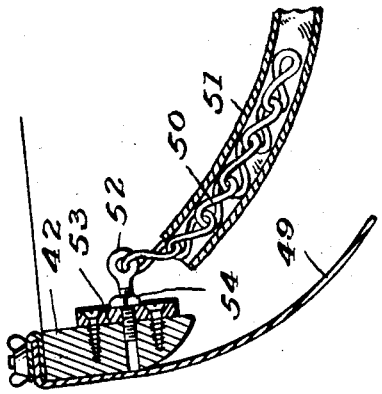
Inventor
JOHN D. GRABILL.
By Milans & Milans
Attorneys Patented Oct. 2, 1934

1,975,687

UNITED STATES PATENT OFFICE 1,975,687

FRUIT CLEANING AND POLISHING MACHINE

John D. Grabill, Woodstock, Va.

Application December 12, 1932, Serial No. 646,911

27 Claims. (Cl. 146—202)

This invention relates to an improved machine for cleaning and polishing fruit, especially fruit such as apples, which require careful handling. The invention more particularly has to do with machines of the type having a series of transversely disposed rotary brushes adapted to brush and convey fruit transversely of their axes, and cleaning means disposed above the series of brushes.
Objects of the invention are to provide an improved machine of the general type referred to of a simple, compact practical nature, that will effectually and rapidly clean and polish a large quantity of fruit; to provide improved cleaning and polishing means of simple construction that will adjust itself to operate efficiently on fruit of different sizes and shapes, that will thoroughly clean and polish all surfaces of the fruit, and that will not injure the fruit.
A particularly important novel characteristic of the invention resides in the special means provided disposed above the series of rotary brushes to cooperate therewith to clean and polish the fruit.
Another important novel feature of the invention lies in the endless traveling belt interposed in the series of rotary brushes for turning the fruit transversely during its travel longitudinally along the series of brushes.
The invention, with other objects, novel features and advantages thereof, and the particular construction, combinations and arrangements of parts comprising the same, will be understood from the hereinafter contained detailed description, when considered in connection with the accompanying drawings forming part hereof and illustrating two embodiments of the invention.

In the drawings:

Fig. 2 is a side elevation.

Fig. 3 is a vertical longitudinal section, on an enlarged scale, of the cleaning and polishing means.

Fig. 4 is a vertical transverse section on the line 4—4 of Figure 3.

Fig. 5 is a detail view of an end portion of one of the fabric covered chains and the means connecting the same to one end of the supporting frame therefor.

Fig. 6 is a detail view of two of the fabric covered chains, intermediate supporting means therefor, and a portion of the fabric blanket.
Fig. 7 is a vertical longitudinal section of a modified form of upper cleaning and polishing means.

Figs. 8 and 9 are detail views of the modified construction illustrated in Figure 7.

Figure 1:
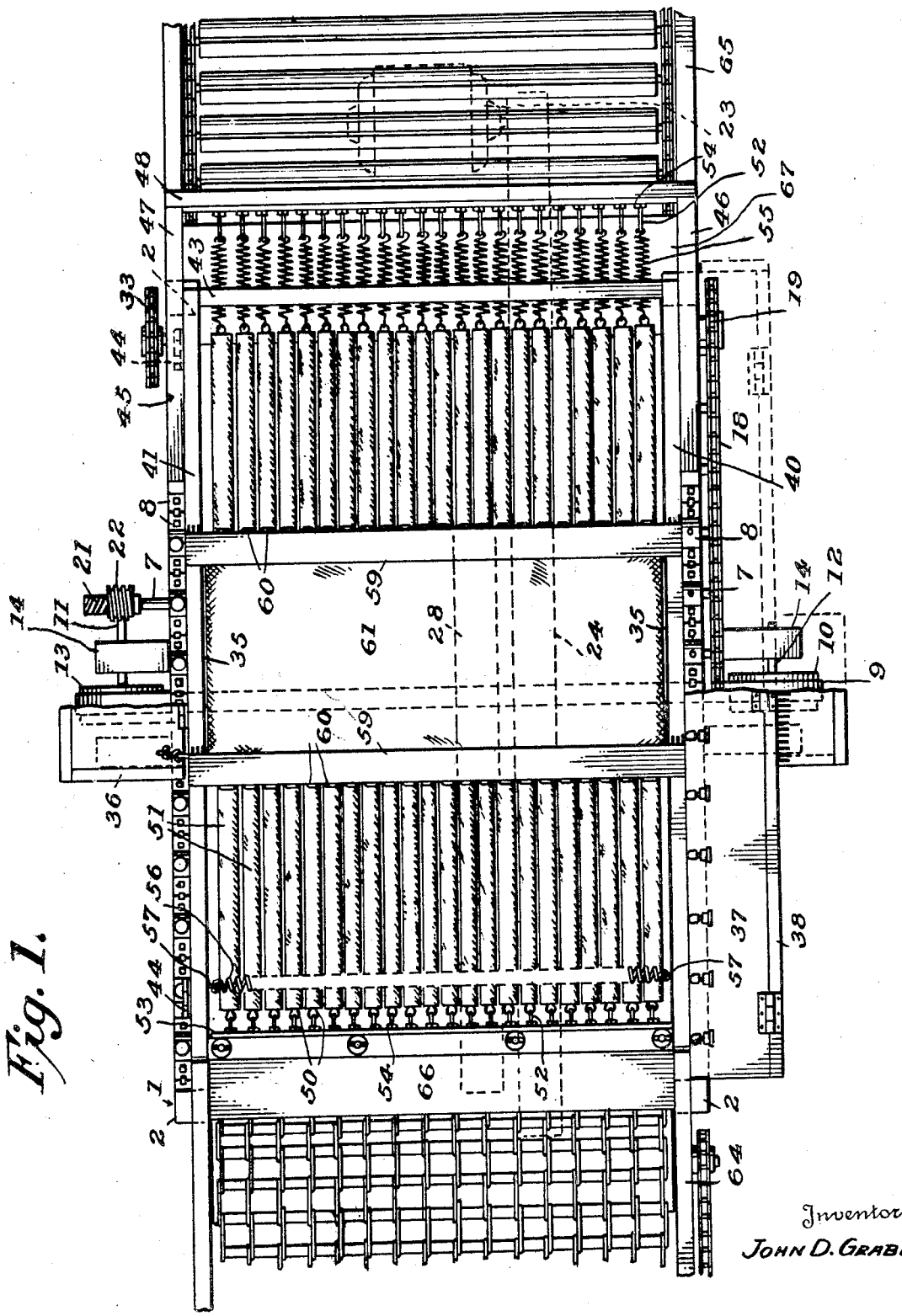
Figure 1 is a top plan view of a fruit cleaning and polishing machine constructed in accordance with the present invention.

While specific embodiments of the invention are illustrated in the drawings, it will of course be understood that changes and modifications may be made in the particular constructions shown, and the invention may be embodied in other forms, as will appeal to those skilled in the art and falling within the scope of the appended claims, without departing from the spirit of the invention.

Referring to a detail description of the particular embodiment of the invention illustrated in Figures 1 to 6 of the drawings, 1 designates the main frame of the machine. The frame 1, which may be of any suitable construction, is shown as comprising pairs of end standards 2, longitudinal sills 3 and intermediate and upper longitudinal bars 4, 5. A series of cylindrical brushes 6 having shafts 7 are mounted for rotation in suitable bearings 8 on the upper longitudinal bars 5 of the frame, the brushes being disposed transversely in parallel relation. The series of brushes are driven in the same direction and operate to convey fruit transversely of their axes and to turn and brush the fruit during its forward travel along the same. The series of rotary brushes 6 are preferably disposed at a slight upward inclination from front to rear of the machine to retard the forward progress of the fruit along the same, the upper longitudinal bars 5 being inclined, as shown.

Interposed in the series of rotary brushes 6 is an endless traveling belt 9, the same being disposed transversely with its upper stretch parallel with the brushes 6 and extending horizontally near the level of the axis of the brush immediately in the rear thereof. The endless belt 9, which is shown located midway the series of brushes, is relatively narrow and is arranged closely adjoining the side peripheries of the pair of brushes between which it is positioned. The endless belt 9 is supported upon pulleys 10, 13, fixed on shafts 12, 11, mounted for rotation on opposite end portions of a pair of cross bars 14, 15, secured to the upper longitudinal bars 5 at the underside thereof and extending a short distance outwardly beyond the sides thereof.

A support or track 16 is provided beneath the belt 9 to prevent undue sagging of the belt. The support or track 16 is so positioned that under normal operating conditions the upper stretch of the belt 9 is out of contact therewith as shown in

Figure 4 of the drawings but should the belt tend to sag, it will engage and be supported by the support 16.

The tendency of the series of rotary brushes 6 is to rotate the fruit on a single axis. The endless belt 9, which is continuously driven at a speed less than the speed of rotation of the brushes 6, operates to change the axis of rotation of the fruit, the fruit as it passes from the first section of the series of brushes on to the endless belt being turned laterally thereby before being picked up and advanced by the brush directly in rear of the belt.

The brushes 6 are driven through sprocket wheels 17 fast on one end of their shafts 7 engaged by a sprocket chain 18, which also engages a sprocket wheel 19 on a drive shaft 20. The endless belt 9 is driven through a worm or bevel gear 21 on one end of shaft 11 meshing with a worm or pinion 22 on the shaft of one of the brushes. Any suitable power means may be employed for operating the series of brushes 6 and the endless belt 9. In the drawings, a motor 23 is shown for this purpose. The motor 23, which is mounted on the lower part of the frame 1, is connected by a belt 24 with a pulley 25 on a transverse shaft 26. The shaft 26 is connected with a shaft 27 by a belt 28 engaging pulleys 29—30, on the shafts. Motion is in turn transmitted from the shaft 27 to the drive shaft 20 by a sprocket chain 31 engaging a sprocket wheel 32 on shaft 27 and a sprocket wheel 33 on shaft 20.

Suitably secured to the upper longitudinal bars 5 of the frame 1 are members 34 extending along the sides of the frame at the ends of the rotary brushes 6 and forming side walls to confine the fruit within the zone of action of the brushes, said side members being shown provided on their inner side faces with coverings 35 of soft material. 36 designates a casing for the pulley 11 and associated gearing, said casing being shown detachably connected to the adjacent side board 34. A casing for the drive gearing of the brushes 6 is shown comprising a top part 37 extending outwardly from the adjoining side member 34, and a hinged side wall 38.

Above the main frame 1 is a rectangular shaped frame 39 comprising side members 40, 41, and end members 42, 43, the side members 40, 41, of the frame resting upon the side members 34. The frame 39 is shown hinged at one side at 44 to one of the side members 34. Secured to the rear portion of the frame 39 and projecting rearwardly therefrom is a supplemental U-shaped frame 45 comprising sides 46, 47, and an end member 48, the sides 46, 47, fitting against the outer side faces of the side members 40, 41, of the frame 39 and being secured thereto.

Referring particularly to Figure 3 of the drawings, 49 designates a wiper of Turkish toweling or other soft flexible fabric, suspended from the forward end member 42 of the frame 39 to extend over the foremost of the series of rotary brushes 6, as shown. In rear of the wiper 49, the frame 39 carries cleaning and polishing means comprising a series of metal chains 50 suspended at opposite ends in closely associated parallel relation longitudinally over the series of rotary brushes 6.

Each of the metal chains 50 is provided with a casing or cover tube 51 of Turkish toweling or other fabric or material of a soft flexible character and that will provide a good brushing and wiping surface.

The metal chains 50 are connected to the frame 39 by means, which provides for the rotary adjustment of the chains to present different surface portions of their casings or cover tubes 51 to the fruit. The means for this purpose is shown as comprising eye bolts 52 engaging threaded apertures in metal plates 53 suitably secured to the forward end member 42 of the frame 39 and to the member 48 of the supplemental frame 45. 54 designates lock nuts on the eye bolts 52.

The metal chains 50 at their rear end portions are connected with the eye bolts through coiled springs 55 to provide for a certain amount of play or movement of the chains longitudinally. The fabric covered chains at their forward end portions are yieldingly supported by a coiled spring 56 extending transversely at the upper side thereof and secured at its ends to the side members 40, 41 of the frame, the ends of the spring 56 being engaged with eyes 57 on the side members. At intermediate points, the fabric covered chains 50, 51 are supported by flexible loops 58 of fabric supported by bars 59 extending across the top of the frame and secured to the frame members 40, 41, the loops 58 having eyes at their upper ends detachably engaging hooks 60 on said bars.

Arranged over a section of the series of fabric covered chains 50, 51, substantially centrally of the ends thereof is a blanket 61 of Turkish toweling or other soft flexible fabric. The blanket 61 is folded as shown and the folds secured together inwardly of the ends of the blanket. Fabric strips 62 extending transversely in the end folds of the blanket 61 and secured to the side members 40, 41, serve to hold the blanket in position.

As illustrated in Figure 3 of the drawings, the fabric covered chains 50, 51 are supported over the series of rotary brushes 6 in spaced relation therewith in position to contact with the fruit while it is being operated on by the brushes. The metal chains 50 through the weight thereof act to press the fabric casings or cover tubes 51 into contact with the fruit and to press the fruit into the brushes. As will be appreciated, the series of closely associated flexible, fabric covered metal chains, supported as hereinbefore described, readily adjust themselves to conform to fruit of different sizes and shapes and in conjunction with the rotary brushes, afford cleaning and polishing means of a highly efficient nature. While the series of fabric covered chains engage and rub the fruit in a way to thoroughly clean and polish all portions of the surfaces of the fruit, the action is such as not to bruise or otherwise injure the fruit. The fabric blanket 61 disposed over the central section of the series of fabric covered chains 50, 51, serves to prevent the fruit from passing to the upper side of the chains in the case of crowding of the fruit in to region of the endless belt 9.

Any suitable means may be employed for feeding the fruit to the machine. In the particular exemplification of the invention illustrated in Figures 1 to 6 of the drawings, the cleaning and polishing machine is shown associated with a grader unit 64 and a sorting conveyor 65 with aprons 66, 67, leading respectively from the grader unit 64 to the entrance of the machine, and from the discharge end of the machine to the sorting conveyor.

In the operation of the machine, fruit passes from the grader unit over the apron 66, to the series of rotary brushes 6. The fruit passing beneath the wiper 49 is given a preliminary wiping thereby. The brushes 6 convey the fruit through the machine, the fruit during its travel along the brushes being brushed and rotated thereby and simultaneously rubbed and wiped by the series of fabric covered chains. The fruit passing from the first section of the rotary brushes onto the endless belt 9 traveling transversely at less speed than the brushes 6 is turned laterally and its axis of rotation changed before being picked up and carried forward by the brushes directly in rear thereof. The fruit thoroughly cleaned and polished is discharged over the apron 67 to the sorter 65.

The modified construction of cleaning and polishing means illustrated in Figures 7, 8 and 9 of the drawings, is the same as that shown in Figures 1 to 6, except that a sheet of fabric is employed with the series of metal chains in place of the independent fabric casings or cover tubes 51.

In these views Figures 7, 8 and 9, 68 designates a sheet of Turkish toweling or like fabric suspended at one end from the forward end 42 of the frame 39 to extend over the series of rotary brushes 6 and beneath the series of metal chains 50, the arrangement being such that the series of chains act to press the fabric sheet into engagement with the fruit and press the fruit into the brushes. The sheet of fabric 68 and the chains 50 are supported at intermediate points by flexible loops of fabric 69, the loops in this instance extending through slots in the fabric sheet 68. The fabric sheet at its rear end is shown connected with the rear end portions of the metal chains by a fabric strip 70 threaded through openings in the fabric sheet and alternately over and under the metal chains, the fabric strip 70 being secured at its ends in any suitable manner, for instance by snap fasteners 71, as shown.

What I claim is:

1. In a machine for cleaning and polishing fruit, the combination of a series of rotary brushes arranged transversely in parallel relation to convey fruit transversely of their axes, means for rotating the series of brushes in the same direction, and a series of fabric covered metal chains suspended at opposite ends in closely associated parallel relation over the series of rotary brushes to contact with the fruit while it is operated on by the brushes.

2. In a machine for cleaning and polishing fruit, the combination of a series of rotary brushes arranged transversely in parallel relation to convey fruit transversely of their axes, means for rotating the series of brushes in the same direction, and a series of fabric covered metal chains suspended at opposite ends in closely associated parallel relation longitudinally over the series of rotary brushes and to contact with the fruit while it is operated on by the brushes.

3. In a machine for cleaning and polishing fruit, the combination of a series of rotary brushes arranged in parallel relation to convey fruit transversely of their axes, means for rotating the series of brushes in the same direction, a series of metal chains suspended at their end portions in closely associated parallel relation longitudinally over the series of rotary brushes, a fabric cover tube on each of the chains, said chains acting to press their fabric cover tubes into contact with the fruit and to press the fruit into the brushes while it is being operated on thereby.

4. In a machine for cleaning and polishing fruit, the combination of a series of rotary brushes arranged in parallel relation to convey fruit transversely of their axes, means for rotating the series of brushes in the same direction, a series of metal chains suspended at their end portions in closely associated parallel relation longitudinally over the series of rotary brushes, a fabric cover tube on each of the chains, said chains acting to press their fabric cover tubes into contact with the fruit and to press the fruit into the brushes while it is being operated on thereby, and means for suspending the chains at their end portions, said means providing for rotary adjustment of the chains to present different surfaces of the fabric cover tubes to the fruit.

5. In a machine for cleaning and polishing fruit, the combination of a series of rotary brushes arranged in parallel relation to convey fruit transversely of their axes, means for rotating the series of brushes in the same direction, a series of metal chains suspended at their end portions in closely associated parallel relation longitudinally over the series of rotary brushes, a fabric cover tube on each of the chains, said chains acting to press their fabric cover tubes into contact with the fruit and to press the fruit into the brushes while it is being operated on thereby, and a fabric blanket extending over a section of the cover tubes of the series of chains at the upper side thereof.

6. In a machine for cleaning and polishing fruit, the combination of a series of rotary brushes arranged in parallel relation to convey fruit transversely of their axes, means for rotating the series of brushes in the same direction, a series of metal chains suspended at their end portions in closely associated parallel relation longitudinally over the series of rotary brushes, a fabric cover tube on each of the chains, said chains acting to press their fabric cover tubes into contact with the fruit and to press the fruit into the brushes while it is being operated on thereby, and flexible means for supporting the chains at points intermediate their ends.

7. In a machine for cleaning and polishing fruit, the combination of a series of rotary brushes arranged in parallel relation to convey fruit transversely of their axes, means for rotating the series of brushes in the same direction, a series of metal chains suspended at their end portions in closely associated parallel relation longitudinally over the series of rotary brushes, a fabric cover tube on each of the chains, said chains acting to press their fabric cover tubes into contact with the fruit and to press the fruit into the brushes while it is being operated on thereby, and means for suspending the chains from their end portions, the suspending means at one end of the chains being resilient.

8. In a machine for cleaning and polishing fruit, the combination of a series of rotary brushes arranged in parallel relation to convey fruit transversely of their axes, means for rotating the series of brushes in the same direction, a series of metal chains suspended at their end portions in closely associated parallel relation longitudinally over the series of rotary brushes, a fabric cover tube on each of the chains, said chains acting to press their fabric cover tubes into contact with the fruit and to press the fruit into the brushes while it is being operated on thereby, and resilient means extending transversely over the series of chains at the forward portion thereof and yieldingly supporting the same.

9. In a machine for cleaning and polishing fruit, the combination of a series of rotary brushes arranged transversely in parallel relation to convey fruit transversely of their axes, means for rotating the brushes in the same direction, and an endless traveling member disposed transversely parallel with the series of rotary brushes with its upper stretch interposed therein between and closely adjoining two of the brushes below the level of the plane of the upper peripheries of the brushes to turn the fruit laterally to present different surfaces thereof to the action of the brushes located rearwardly of said member, and means for driving said endless member.

10. In a machine for cleaning and polishing fruit, the combination of a series of rotary brushes arranged transversely in parallel relation to convey fruit transversely of their axes, means for rotating the brushes in the same direction, and an endless belt disposed transversely parallel with the series of rotary brushes with its upper stretch interposed therein between and closely adjoining two of the brushes below the level of the plane of the upper peripheries of the brushes to turn the fruit laterally to present different surfaces thereof to the action of the brushes located rearwardly of said belt, and means for driving the belt.

11. In a machine for cleaning and polishing fruit, the combination of a series of rotary brushes arranged transversely in parallel relation to convey fruit transversely of their axes, means for rotating the brushes in the same direction, and cleaning means comprising a series of metal chains suspended at their ends in closely associated parallel relation over the series of rotary brushes, and fabric associated with the metal chains to be pressed thereby into contact with the fruit while it is being operated on by the rotary brushes.

12. In a machine for cleaning and polishing fruit, the combination of a series of rotary brushes arranged transversely in parallel relation to convey fruit transversely of their axes, means for rotating the brushes in the same direction, and cleaning means comprising a series of metal chains suspended at their ends in closely associated parallel relation longitudinally over the series of rotary brushes, and fabric associated with the metal chains to be pressed thereby into contact with the fruit while it is being operated on by the rotary brushes.

13. In a machine for cleaning and polishing fruit, the combination of a series of rotary brushes arranged transversely in parallel relation to convey fruit transversely of their axes, means for rotating the brushes in the same direction, and cleaning means comprising a series of metal chains suspended at their ends in closely associated parallel relation longitudinally over the series of rotary brushes, fabric associated with the metal chains to be pressed thereby into contact with the fruit while it is being operated on by the rotary brushes, and resilient means extending transversely over the series of chains near the forward end portions thereof and yieldingly supporting the same.

14. In a machine for cleaning and polishing fruit, the combination of a series of rotary brushes arranged transversely in parallel relation to convey fruit transversely of their axes, means for rotating the brushes in the same direction, and cleaning means comprising a series of metal chains suspended at their ends in closely associated parallel relation longitudinally over the series of rotary brushes, fabric associated with the metal chains to be pressed thereby into contact with the fruit while it is being operated on by the rotary brushes, and flexible means for supporting the chains at points intermediate their ends.

15. In a machine for cleaning and polishing fruit, the combination of a series of rotary brushes arranged transversely in parallel relation to convey fruit transversely of their axes, means for rotating the brushes in the same direction, and cleaning means comprising a series of metal chains disposed in closely associated parallel relation longitudinally over the series of rotary brushes, means for suspending the chains at their end portions, the suspending means at one end of the chains being resilient, and fabric associated with the metal chains to be pressed thereby into contact with the fruit while it is being operated on by the rotary brushes.

16. In a machine for cleaning and polishing fruit, the combination of a series of rotary brushes arranged transversely in parallel relation to convey fruit transversely of their axes, means for rotating the brushes in the same direction, and cleaning means comprising a series of metal chains disposed in closely associated parallel relation longitudinally over the series of rotary brushes, means for suspending the chains at their end portions, the suspending means at one end of the chains being resilient, fabric associated with the metal chains to be pressed thereby into contact with the fruit while it is being operated on by the rotary brushes, and resilient means extending transversely over the series of chains near the forward end portions thereof and yieldingly supporting the same.

17. In a machine for cleaning and polishing fruit, the combination of a series of rotary brushes arranged transversely in parallel relation to convey fruit transversely of their axes, means for rotating the brushes in the same direction, and cleaning means comprising a series of metal chains suspended at their ends in closely associated parallel relation longitudinally over the series of rotary brushes, fabric associated with the metal chains to be pressed thereby into contact with the fruit while it is being operated on by the rotary brushes, resilient means extending transversely over the series of chains near the forward end portions thereof and yieldingly supporting the same, and flexible means for supporting the chains at points intermediate their ends.

18. In a machine for cleaning and polishing fruit, the combination of a series of rotary brushes arranged transversely in parallel relation to convey fruit transversely of their axes, means for rotating the brushes in the same direction, and cleaning means comprising a series of metal chains suspended at their ends in closely associated parallel relation over the series of rotary brushes, and soft absorbent fabric associated with the metal chains to be pressed thereby into contact with the fruit while it is being operated on by the rotary brushes.

19. In a machine for cleaning and polishing fruit, the combination of a series of rotary brushes arranged transversely in parallel relation to convey fruit transversely of their axes, means for rotating the brushes in the same direction, and cleaning means comprising a sheet of fabric suspended at one end and disposed over the series of rotary brushes, and a series of metal chains suspended at their ends in closely associated parallel relation to rest on top of the sheet of fabric and press the same into contact with the fruit and to press the fruit into the brushes while it is being operated on thereby.

20. In a machine for cleaning and polishing fruit, the combination of a series of rotary brushes arranged transversely in parallel relation to convey fruit transversely of their axes, means for rotating the brushes in the same direction, and cleaning means comprising a sheet of fabric disposed over the series of rotary brushes, means for suspending the fabric from one end thereof, flexible means for supporting the fabric at points intermediate its ends, and a series of metal chains suspended at their ends in closely associated parallel relation longitudinally to rest on top of the sheet of fabric and press the same into contact with the fruit and to press the fruit into the brushes while it is being operated on thereby.

21. In a machine for cleaning and polishing fruit, the combination of a series of rotary brushes arranged transversely in parallel relation to convey fruit transversely of their axes, means for rotating the series of brushes in the same direction, and a series of flexible members suspended at opposite ends to normally extend in closely associated relation longitudinally over the series of rotary brushes, each of said members comprising yieldably related weight members enclosed in a tubular protective and wiping casing adapted to contact the fruit while the fruit is being operated on by the rotary brushes.

22. In a machine of the class described, the combination of means for supporting and conveying fruit or the like, and a series of flexible members suspended to normally extend in closely associated relation over the supporting and conveying means, each of said members comprising yieldably related weight members enclosed in a tubular protective and wiping casing and adapted to contact the fruit or the like supported on said means.

23. In a machine of the class described, the combination of means for supporting and conveying fruit or the like, and a series of flexible members suspended to normally extend in closely associated relation over and longitudinally of the supporting and conveying means, each of said members comprising yieldably related weight members enclosed in a tubular protective and wiping casing and adapted to contact the fruit or the like supported on said means.

24. In a machine of the class described, the combination of means for supporting and conveying fruit or the like, and a series of fabric covered metal chains suspended to extend in closely associated relation over the supporting and conveying means to contact the fruit or the like supported thereon.

25. In a machine of the class described, the combination of means for supporting and conveying fruit or the like, and a series of flexible members suspended to normally extend in closely associated relation over the supporting and conveying means, said members being pliable and flexible substantially throughout their length, each of said flexible members comprising weight members yieldably related for relative angular movement vertically and laterally, and fabric associated with said flexible members to be pressed thereby into contact with the fruit or the like supported on said conveying means.

26. In a machine of the class described, the combination of means for supporting and conveying fruit or the like, and cleaning means comprising a sheet of fabric suspended at one end and disposed over the supporting and conveying means, and a series of flexible members each comprising yieldably related weight members, said flexible members being suspended in closely associated relation to rest on top of the sheet of fabric and press the same into contact with the fruit carried by the conveying means.

27. In a machine of the class described, the combination of means for supporting and conveying fruit or the like, and cleaning means comprising a sheet of fabric suspended at one end and disposed over the supporting and conveying means, and a series of metal chains suspended in closely associated relation to rest on top of the sheet of fabric and press the same into contact with the fruit carried by the conveying means.

JOHN D. GRABILL.